(12) United States Patent
Ward et al.

(10) Patent No.: US 6,961,655 B2
(45) Date of Patent: Nov. 1, 2005

(54) METHOD AND APPARATUS FOR COMMUNICATING WITH AN ELECTRONIC ENGINE CONTROL

(75) Inventors: Lance M. Ward, Lansing, MI (US); John D. Meaney, Hartland, MI (US)

(73) Assignee: TCI Automotive, LLC, Memphis, TN (US)

( * ) Notice: Subject to any disclaimer, the term of this patent is extended or adjusted under 35 U.S.C. 154(b) by 245 days.

(21) Appl. No.: 10/181,098

(22) PCT Filed: Jan. 8, 2001

(86) PCT No.: PCT/US01/00496

§ 371 (c)(1),
(2), (4) Date: Aug. 26, 2003

(87) PCT Pub. No.: WO01/52070

PCT Pub. Date: Jul. 19, 2001

(65) Prior Publication Data

US 2004/0039515 A1 Feb. 26, 2004

Related U.S. Application Data

(60) Provisional application No. 60/175,038, filed on Jan. 7, 2000.

(51) Int. Cl.$^7$ ............................................. G06F 17/00

(52) U.S. Cl. ........................ 701/115; 701/101; 370/313

(58) Field of Search ................... 701/115, 101, 102, 701/29, 35; 370/313, 310, 401; 455/457, 455/456.3; 340/825.46

(56) References Cited

U.S. PATENT DOCUMENTS

| | | | |
|---|---|---|---|
| 5,398,190 A * | 3/1995 | Wortham ................. | 455/456.3 |
| 5,732,074 A | 3/1998 | Spaur et al. .............. | 370/313 |
| 5,826,205 A | 10/1998 | Koelle et al. ............. | 701/29 |
| 5,884,210 A | 3/1999 | Rettig et al. ............. | 701/115 |
| 5,938,716 A | 8/1999 | Shutty et al. ............ | 701/115 |
| 6,081,755 A | 6/2000 | Fujimoto ................. | 701/1 |
| 6,108,598 A | 8/2000 | Sumitani ................. | 701/29 |
| 6,112,152 A | 8/2000 | Tuttle ..................... | 701/115 |
| 6,480,098 B2 * | 11/2002 | Flick ....................... | 340/426.1 |
| 6,760,659 B1 * | 7/2004 | Cowen ..................... | 701/115 |
| 2003/0214392 A1 * | 11/2003 | Flick ....................... | 340/825.72 |

FOREIGN PATENT DOCUMENTS

EP 0 919 419 A1 * 2/1999 .......... B60K 31/00

* cited by examiner

*Primary Examiner*—Hieu T. Vo
(74) *Attorney, Agent, or Firm*—Clark Hill PLC

(57) ABSTRACT

An internal combustion engine (10) includes an engine control unit (14). The engine control unit (14) provides control logic and signals to operate the internal combustion engine (10). The engine control unit (14) receives data from sensors (28) and outputs commands through command lines (30). The engine control unit (14) also communicates to a remote computer to receive changes in parameters or output requirements. A remote communicator (32) facilitates the communication between the engine control unit (14) and the remote computer. The remote communicator (32) also allows functions of the engine control unit (14) to be enabled or disabled. If functions are enabled, the remote computer may also provide initial parameters of operation allowing the engine control unit (14) to properly control the internal combustion engine (10).

10 Claims, 3 Drawing Sheets

METHOD AND APPARATUS FOR COMMUNICATING WITH AN ELECTRONIC ENGINE CONTROL

This application claims the benefit of provisional application No. 60/175,038 filed Jan. 7, 2000.

BACKGROUND ART

1. Field of the Invention

The invention relates to communicating with an electronic engine control for an engine of a motor vehicle. More specifically, the invention relates to engine control and calibration by communicating with the electronic engine control of an engine of a motor vehicle.

2. Description of the Related Art

Electronics have enhanced the control over every function of the motor vehicle. The internal combustion engine has also been enhanced. This is because the electronics more precisely control the operation of the internal combustion engine. The controls can be used to from determining how much fuel is to be consumed down to limiting the output produced based on the emissions during a particular operation.

Many enthusiasts and those that tinker ("enthusiasts") are reluctant to embrace the electronic technologies. The enthusiasts often consider their motor vehicles works in flux. The motor vehicles are constantly being tuned, enhanced and/or modified all to add any amount of horsepower available. When an internal combustion engine is controlled electronically, the electronic controls require changing. This presents many problems.

A primary problem is the inflexibility of an electronic control system. Often times, an electronic control system may only work with a specific hardware and engine configurations. Therefore, in order for an enthusiast to tweak the performance of the motor vehicle, any number of working parts, either electronic hardware or internal combustion engine parts, must be replaced. This adds cost and time to any enhancement.

A secondary problem is the actual work required to make such changes. The swapping of electronic components, especially the electronic control system, requires a great deal of knowledge with respect to how the other components, mechanical and electrical, interact with each other. This may require additional training or the hiring of a specialist.

A third problem with the electronic control systems of the prior art is their inability to communicate with remote computing devices. In many instances, it is desirable to communicate remotely with the electronic control system of a motor vehicle while it is operating to make changes to parameters allowing the remote operator to view how the outputs of the internal combustion engine change with varying the input parameters. Currently, the only way to make such changes is to install a computer onboard and hardwire it to a modified electronic control system. This type of set up typically converts the passenger seat into a computer stand and requires the driver to divert some attention away from the road. It also requires the driver to have a working knowledge of how to operate the computer and/or the electronic control system.

SUMMARY OF THE INVENTION

An engine control assembly for an internal combustion engine of a motor vehicle is disclosed. The engine control assembly includes a controller that is disposed adjacent the internal combustion engine. The controller includes an output port and provides control signals to operate the internal combustion engine at the output port. The engine control assembly also includes a remote communicator in communication with said controller. The remote communicator transmits signals from the controller to a remotely located computer. Signals may then be received from the remotely located computer and transmitted to the controller from the engine control unit allowing the controller to modify the control signals transmitted to the internal combustion engine.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT

Remote Communications

Figure 1:
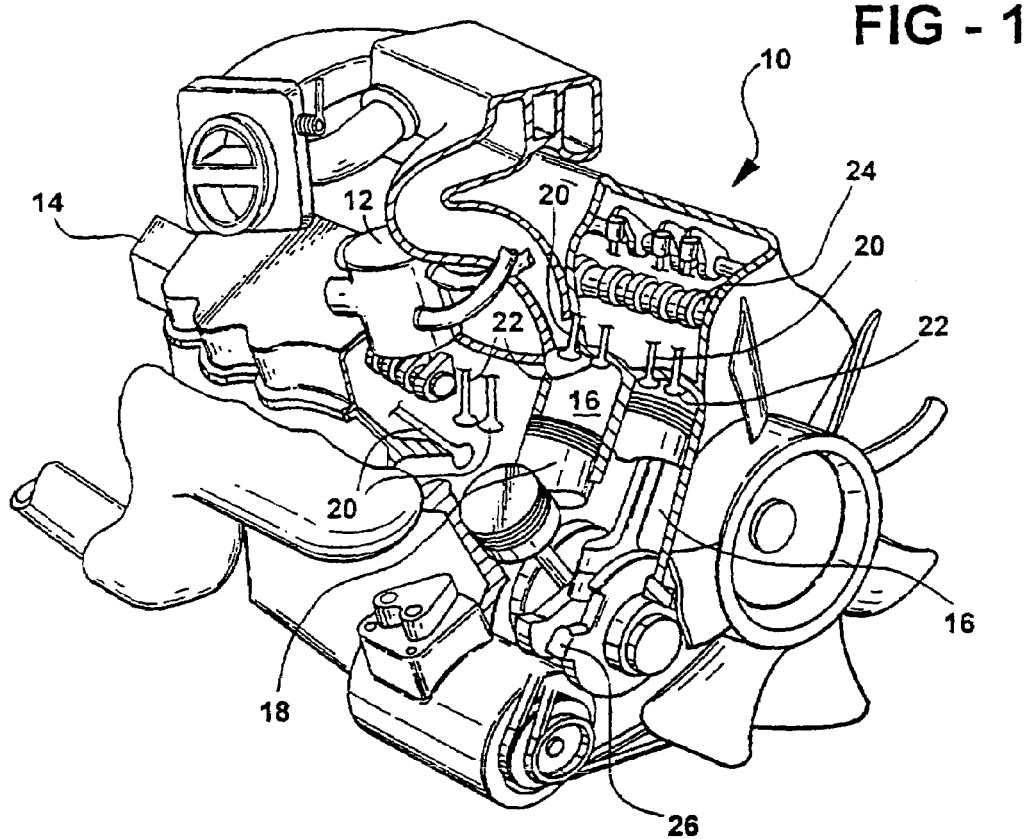
FIG. 1 is a perspective view of an internal combustion engine incorporating one embodiment of the invention.

Referring to FIG. 1, a perspective view partially cut away of an engine for a motor vehicle is generally indicated at 10. The engine 10 is an internal combustion engine. The internal combustion engine 10 may include a distributor 12 or, in the alternative, it may include an electronic set up more appropriate for operation with an electronic fuel injector system (neither shown). The internal combustion engine 10 is controlled by an electronic engine control 14. The engine control unit ("ECU") 14 provides all electrical and electronic communication between the various subsystems of the internal combustion engine 10 and other systems of the motor vehicle (none shown). The ECU 14 will be described in greater detail subsequently. The internal combustion engine 10 includes a plurality of cylinders 16, each having a piston 18 and at least one intake valve 20 and one exhaust valve 22. The valves 20, 22 are moved by a camshaft 24 and the pistons 18 move a crankshaft 26.

Figure 2:
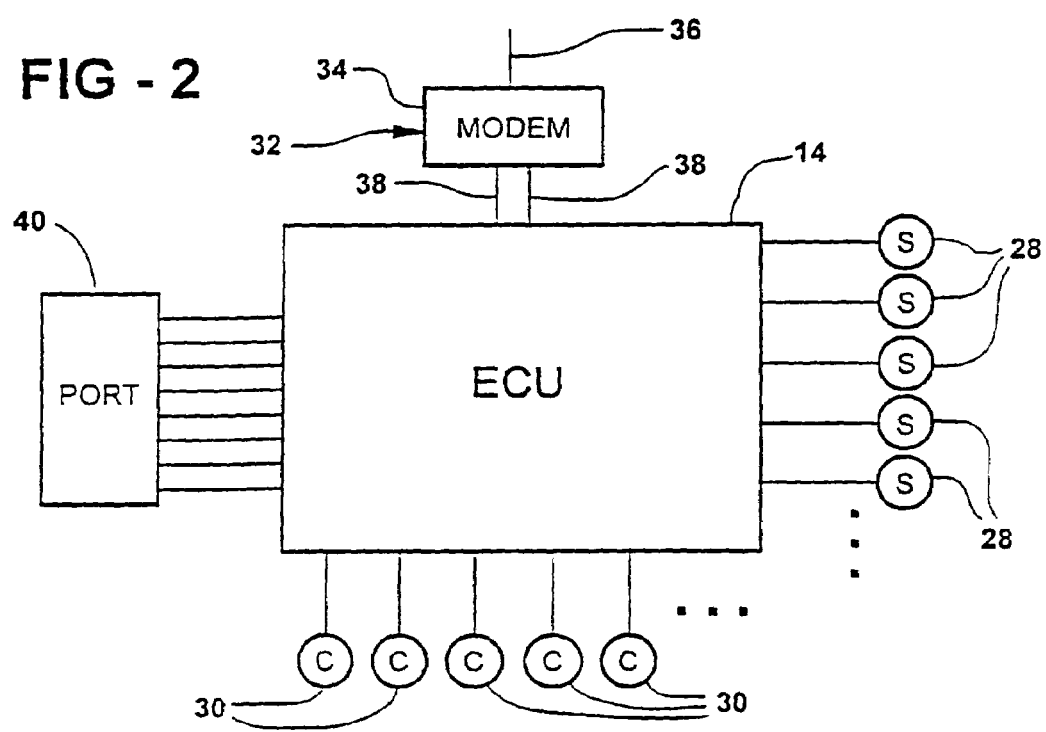
FIG. 2 is a block diagram of one embodiment of the invention.

Referring to FIG. 2, a block diagram of the ECU 14 is shown as it relates to the components with which it communicates. The ECU 14 receives its data from a plurality of sensors 28. These sensors 28 represent the sensors required to operate the internal combustion engine 10. A non-exhaustive list of the sensors required to operate the internal combustion engine 10 include a cam shaft sensor, a crank shaft sensor, MAP sensors, detonation sensors, temperature sensors, nitrous oxide sensors, and the like. After all of the data is transmitted to the ECU 14, the ECU 14 creates commands based thereon. More specifically, the ECU 14 operates the internal combustion engine 10 based on the signals it receives from the sensors 28. The ECU 14 transmits the commands and controls out therefrom through a plurality of command lines 30. The command lines 30 are merely conductors that connect the ECU 14 to the various components of the internal combustion engine 10 being controlled by the ECU 14. Such parameters may include the timing adjustment of the firing of a spark plug, or the adjustment of the mixture of air and gas. Still another possible adjustment made by the ECU 14 would be adjusting parameters that are a function of temperature or change.

Attached to the ECU 14 is a remote communicator, generally shown at 32. The remote communicator 32 receives data from the ECU 14 and transmits the data to a remote location. Typically, the remote location would be a computer in a lab or in a pit area of a racetrack. The remote communicator 32 may include a modem 34, a network connection (not shown), an antenna 36 or a cell phone (not shown) and a protocol allowing the remote communicator 32 to communicate with ECU 14. While infrared and radio frequency communications are contemplated, electrical signals transmitted through at least one conductor 38 between the modem 34 and the ECU 14 are used in the preferred embodiment. In the embodiment shown, there are two conductors 38 extending between the ECU 14 and the modem 34. These two conductors 38 could represent an RS-232 interface or they may be a dedicated connection. It should be appreciated by those skilled in the art that the list of modes of communication listed above is exemplary in nature and not exhaustive. Other methods of communication may be used without extending out of the scope of the invention.

The modem 34 operates by standing in a wait loop. When the modem 34 receives a request, data is received after the ECU 14 identifies the data being requested and transmits the data to the modem 34. The block of data is then sent remotely using the modem 34 and antenna 36. The modem 34 sends a block or frame of data at a time. The modem 34 is capable, through the commands it receives from the remote computer, of requesting data on the status of parameters, the condition of the internal combustion engine 10 or the condition and state of the ECU 14. The modem 34 is also capable of receiving commands required to modify the performance of the internal combustion engine 10.

Figure 3:
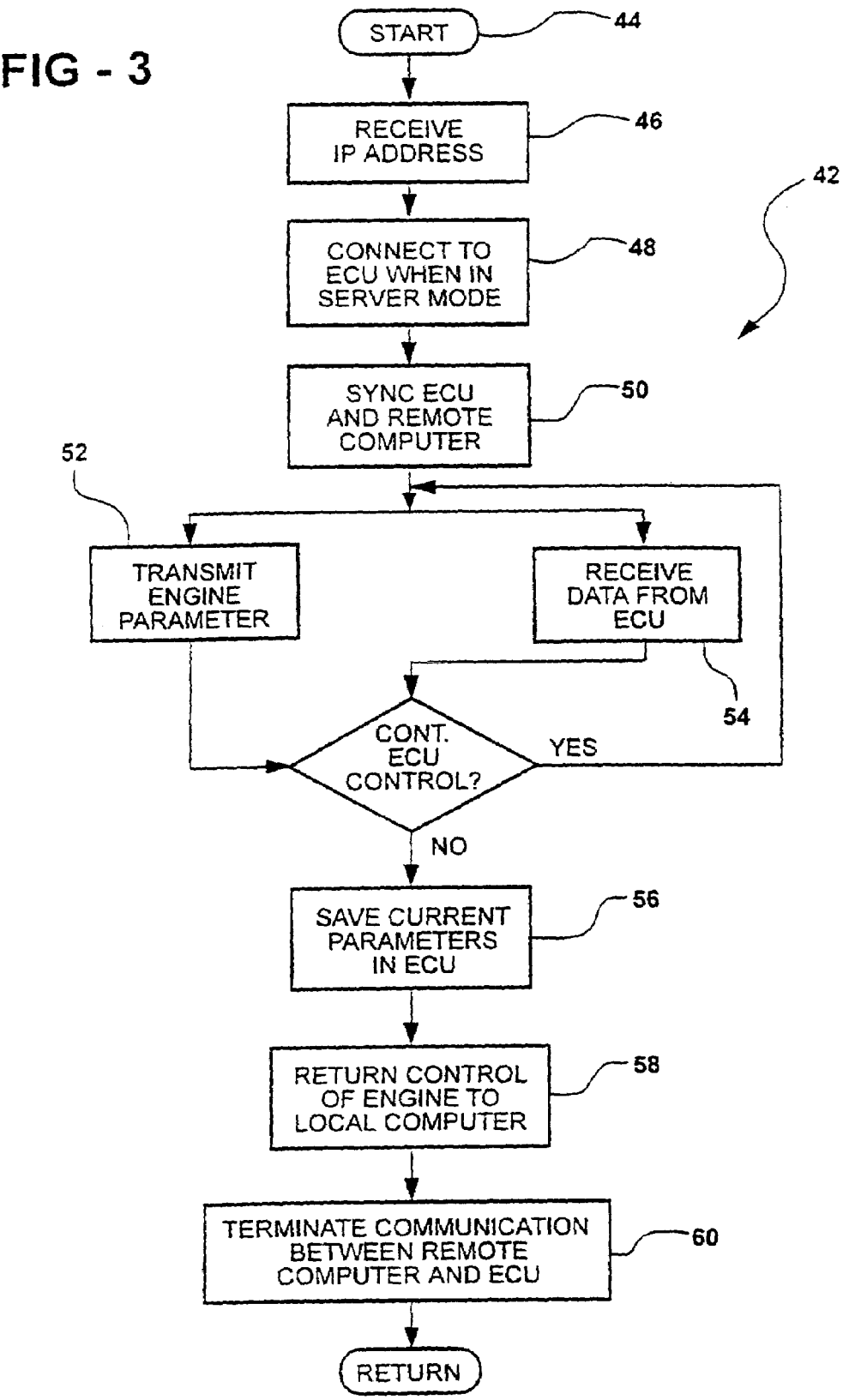
FIG. 3 is a logic chart identifying the method of one embodiment of the invention.

Referring to FIG. 3, the method is shown generally at 42. The method begins at 44. The first step of the method 42 is to initiate communication 46 between the remote computer and the engine control unit 46. This typically involves identifying the engine control unit 14 to the remote computer. In the preferred embodiment, an IP address associated with the computing device of the engine control unit 14 will suffice.

Once identified, the remote computer and the engine control unit 14 are connected electronically to communicate therebetween at 48. In order for this to happen, the engine control unit 14 must be in a server mode. Server mode as used herein means that the engine control unit 14 has resources available to receive inputs external thereto and are able to act in some way on those inputs.

The engine control unit 14 and the remote computer are then synchronized at 50. This allows the remote operator to control the engine control unit 14 as if the operator were local to the engine control unit 14. In this mode, the local operator of the internal combustion engine 10 may or may not be able to view the changes being made or parameters being viewed by the remote operator. The local and remote operators may, however, communicate through a chat window.

After the two computing devices are synchronized, new parameters or data may be transmitted to the ECU 14 at 52 or, alternatively, the remote computer may receive data from the ECU 14 at 54.

These two steps 52, 54 allow the remote computer to view outputs of the internal combustion engine 10 or change parameters associated with inputs or conditions of the internal combustion engine 10.

The current parameters and values are save in the ECU 14 at 56. The control of the ECU 14 as well as the internal combustion engine 10 are returned thereto at 58. Communication is terminated at 60 allowing the ECU 14 to return to its normal mode of operation.

Method For Enhancing The ECU

A method for enhancing the ECU 14 is described. The method requires the use of the remote communicator 34. In the alternative, a more traditional port 40 may be used. The port 40 shown in FIG. 2 is an RS-232 port. To reduce costs in manufacturing different models of a particular ECU 14, one model is designed for all performance requirements that may be required of the ECU 14. Certain functions capable of being performed by the ECU 14 are disabled depending on the model purchased by the user of the ECU 14. By way of example, it may not be the desire of some users of the ECU 14 to monitor and modify two features, namely nitrous oxide (NOx) output or fan control. The user then does not have to purchase a model of the ECU 14 capable of monitoring and modifying those features.

The ECU 14 is capable, however, of monitoring these features. If, in the future, the user of the partially disabled ECU 14 would like to maximize the functionality of the ECU 14, software capable of enabling the ECU 14 may be operated. More specifically, because the ECU 14 is capable of communicating with other electronic devices via the RS-232 port 40 and the remote communicator 32, the ECU 14 can receive commands exteriorly therefrom to enable previously disabled functions of the ECU 14. This allows for greater flexibility and reduced maintenance in switching out or replacing ECUs 14 based on the needs of the user thereof.

Certain functions are turned off or on by changing a value in a specific address. In other situations, a value being reviewed by a specific feature may be unnaturally tied to a particular value, i.e., zero, effectively keeping a function from operating. If the software introduced to the ECU 14 changed the value in the specific address, the function may be turned on. Likewise, if the value in a specific address were no longer identified as a particular value and were able to be a variable representing a natural state of a particular device, then the function of the ECU 14 may be turned on.

Figure 4:
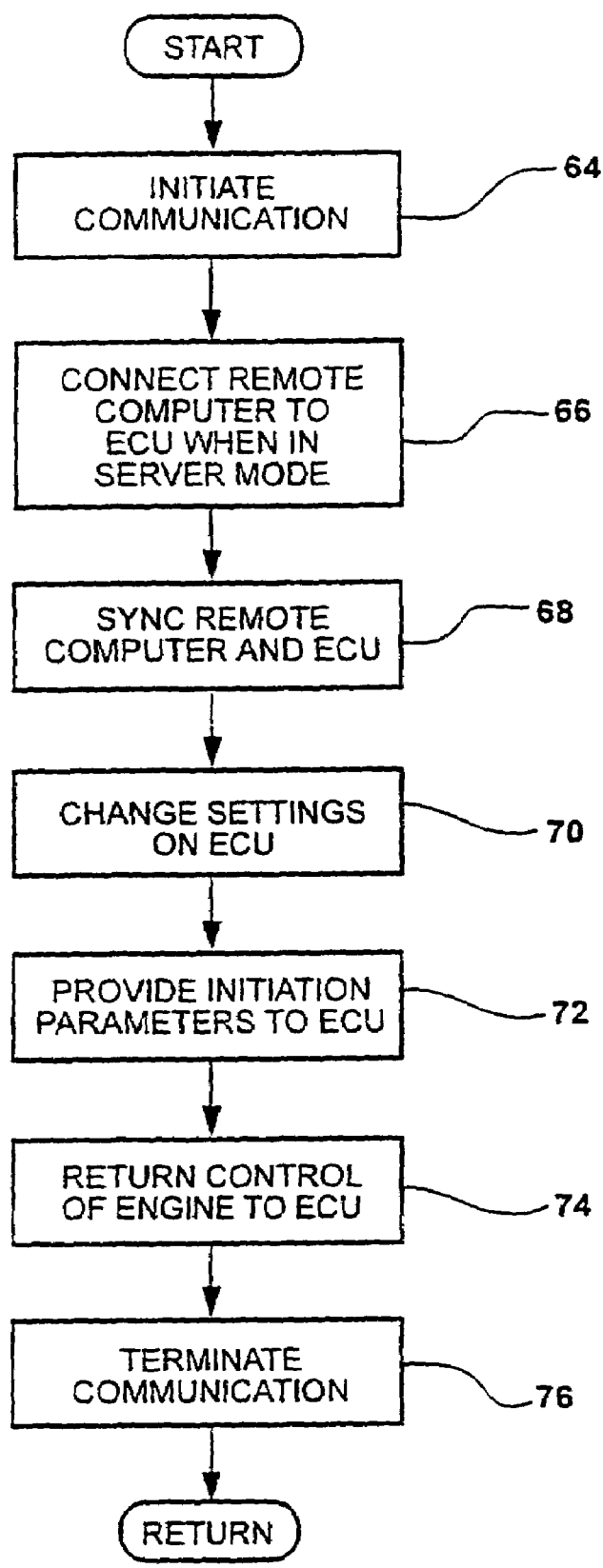
FIG. 4 is a logic chart identifying a second method of the invention.

Referring to FIG. 4, one embodiment of this invention is generally indicated at 62. Once communication is initiated at 64, the remote computer and the ECU 14 are electronically connected at 66. This only occurs when the ECU 14 is in the server mode. The ECU 14 and the remote computer are synchronized at 68.

After synchronization, the operator of the remote computer changes the settings in the ECU 14 at 70. The settings that are changed allow for the additional functionality in the ECU 14 not previous available to the local operator of the motor vehicle.

In addition, should the enhancements to the ECU 14 functionality require, initial parameters are transmitted to the ECU 14 for those additional functions at 72. After the additional features are initialized with proper settings and/or values, the control of the ECU 14 is returned to the local operator at 74 and communication therebetween is terminated at 76. While not discussed, it should be appreciated that features may be disenabled in a fashion similar to that which is discussed above without extending beyond the scope of the inventive method.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. An engine control assembly for an internal combustion engine of a motor vehicle, said engine control assembly comprising:

a controller disposed adjacent to the internal combustion engine, said controller including an output port and providing control signals to operate the internal combustion engine at said output port; and a remote communicator in communication with said controller, said remote communicator transmitting signals from said controller to a remotely located computer, receiving signals from the remotely located computer and transmitting the signals received to said controller allowing said controller to modify said control signals transmitted to the internal combustion engine.

2. An engine control assembly as set forth in claim 1 wherein said remote communicator includes a modem.

3. An engine control assembly as set forth in claim 2 wherein said remote communicator includes an antenna to aid in the transmission and reception of signals between said controller and the remotely located computer.

4. An engine control assembly as set forth in claim 2 wherein said modem is electrically connected with said controller.

5. A method for providing upgrades in operation of an internal combustion engine of a motor vehicle controlled by an engine control unit having a remote communicator, the method comprising the steps of:

initiating communication with the engine control unit using the remote computer;

synchronizing the remote computer with the engine control unit;

changing settings on the engine control unit allowing additional features to be utilized by an operator of the motor vehicle;

returning control of the internal combustion engine to the engine control unit; and terminating the communication between the engine control unit and the remote computer.

6. A method as set forth in claim 5 including the step of providing initiation parameters for the additional features added allowing the additional features to operate properly.

7. A method for remotely communicating with a local engine control unit, having an IP address, of an internal combustion engine with a remote computer, the method comprising the steps of:

initiating communication with the engine control unit using the remote computer;

synchronizing the remote computer with the engine control unit;

bi-directionally communicating between the remote computer and the engine control unit to establish current parameters of operation;

returning control of the internal combustion engine to the engine control unit; and terminating the bi-directional communication.

8. A method as set forth in claim 7 including the step of saving the current parameters of operations in the engine control unit prior to the step of returning control of the internal combustion engine to the engine control unit.

9. A method as set forth in claim 8 switching the engine control unit to a server mode prior to the step of initiating communication.

10. A method as set forth in claim 9 wherein the step of initiating communication includes the step of the remote computer receiving an IP address to facilitate the step of initiating communication.

* * * * *